Jan. 20, 1942.  C. CLARKE ET AL  2,270,238
PROTECTIVE GOGGLES
Filed April 17, 1940  6 Sheets-Sheet 3

Inventors
C. CLARKE
P. C. LIVINGSTON
by Blair + Kilcoyne
Attorneys

Jan. 20, 1942.  C. CLARKE ET AL  2,270,238
PROTECTIVE GOGGLES
Filed April 17, 1940    6 Sheets-Sheet 4

Inventors
C. CLARKE
P. C. LIVINGSTON
by Blair & Kilcoyne
Attorneys

Jan. 20, 1942.  C. CLARKE ET AL  2,270,238
PROTECTIVE GOGGLES
Filed April 17, 1940  6 Sheets-Sheet 6

Inventors
C. CLARKE
P. C. LIVINGSTON
by Blain & Kilcoyne
Attorneys

Patented Jan. 20, 1942

2,270,238

UNITED STATES PATENT OFFICE 2,270,238

PROTECTIVE GOGGLES

Clement Clarke and Philip Clermont Livingston, London, England, assignors to Clement Clarke Limited, London, England, a British company Application April 17, 1940, Serial No. 330,214
In Great Britain April 17, 1939

23 Claims. (Cl. 2—14)

This invention relates to protective goggles for personal wear, such for example as those for use by airmen, motorists or welding operators.

An object of the invention is to provide goggles giving a greater field of vision, more especially on the temporal side than has hitherto been provided. A further object is to provide an improved mounting for the eye-pieces so as to facilitate ready replacement or substitution of the eye-pieces.

Yet a further object is to facilitate adjustment of the goggles to suit the face of the wearer, that is to say the relative spacing of the eyes and the dimensions of the face, without causing reduction of the field of vision. Another object of the invention is to provide an improved combination of a pair of goggles with a helmet, including means for attaching the goggles to the helmet so that the goggles can be readily adjusted in position thereon to suit requirements.

A further object is to provide means whereby protective goggles will fit snugly and comfortably on the face of the wearer, more particularly when the goggles are worn when travelling at high speeds, as for example in aeroplanes with open cockpits or on motor bicycles. Another object of the invention is to provide as part of the goggles improved means for protecting the wearer's eyes from the glare of the sun, said means being readily adjustable and automatically maintained in the position of adjustment.

These and further objects will be apparent from the following description of the accompanying drawings, in which.

In the construction shown in Figures 1 to 8 the goggles comprise two eye-piece frames A each made in one integral metal stamping or moulding, for example of a phenolic condensation product. The frames A are suitably curved to suit the contours of the human face, each frame having an aperture or window $A^1$ with a surrounding recess $A^2$ into which fits an eye-piece comprising a frontal glass $B^1$ and a side glass $B^2$, as hereinafter described with reference to Figure 2. The two eye-piece frames are connected together by an adjustable bridge portion C, which will be described with reference to Figures 5 and 7 and on which is mounted a support for a sun-shield or visor D.

Rigidly attached to or formed integral with each frame A at the outer end thereof are two rings, eyes, loops or clips $A^3$ through which extends a ring $E^1$ of stout cord or elastic preferably covered with a suitable fabric having good wearing properties. Each connection $A^3$ may grip the cord $E^1$ firmly or may be such that the goggles can slide along the cord $E^1$ fairly freely.

The helmet E is provided on each side with a metal plate $E^2$ above eye-level and a metal plate $E^3$ below eye-level, the plate $E^3$ having an open metal hook $E^4$ whilst the upper plate $E^2$ has a number of press studs or sockets $E^5$ spaced at different distances from eye-level and with any one of which a metal hook $E^6$ can be engaged. The hooks $E^4$, $E^6$ are so constructed that whilst the endless cord $E^1$ can be forced into or out from them (owing to the resilience of the hook and/or of the cord) they will normally retain the cord but permit it to slide through them. A tensioning strap $E^7$ having two loops $E^8$ through which the cords $E^1$ can slide is employed either as a back strap as shown in full lines in Figure 1 or as a chin strap shown in chain line.

Figure 1:
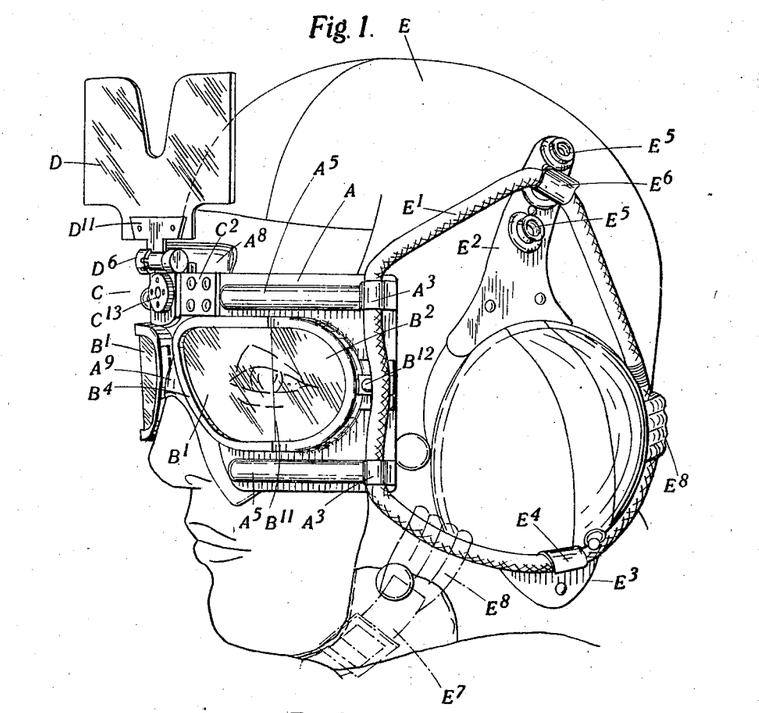
Figure 1 shows one combination of goggles and helmet according to the invention.

It will be clear that with this arrangement the endless cords $E^1$ will hold the goggles firmly in position, the final pressure being regulatable by the strap $E^7$ (whether used as a back strap or a chin strap). The goggles can also be readily adjusted into an inoperative position on the forehead of the wearer by sliding the cords $E^1$ through the hooks $E^4$ $E^6$ and/or sliding the eyes $A^3$ along the cords.

Each eye-piece frame A is provided, in its inner surface above and below the eye-piece window $A^1$, with an elongated slot $A^4$ (Figures 3 and 8) in front of which a trough-like member $A^5$ is formed, by welding, stamping or moulding, this trough being somewhat wider than the associated slot $A^4$ so as to form a pocket with a reduced mouth or opening. Each of these pockets accommodates the resilient holding bead $A^6$ of a detachable face pad. Each pad consists of a narrow strip $A^7$ of resilient material, such as sponge rubber, of suitable width and thickness. The front portion of the strip is covered with somewhat harder rubber, preferably ribbed longitudinally, to form the holding bead $A^6$, whose external dimensions should suit those of the pocket $A^5$ and should be slightly larger than those of the slot $A^4$, so that the bead $A^6$ can be compressed as it is forced through the slot $A^4$ into the pocket $A^5$ to hold the face pad in place. A further face pad $A^8$ is provided behind the adjustable bridge portion C and may be detachably secured by a resilient holding bead engaging in a pocket or alternatively may be attached at its sides to the edges of the eye-piece frames. The pad $A^8$ has a downward extension $A^9$, for example of soft leather, to fit over the nose of the wearer.

When all the pads $A^7$, $A^8$, $A^9$ are in position they will not only enable the goggles to fit snugly against the face of the wearer but will also form a more or less wind-proof joint with the face and thereby adequately protect the eyes against wind and minimise risk of the goggles being forced out of place by penetration of the wind between the goggles and the face. The ready detachability of the face pads $A^7$ not only facilitates manufacture but also makes it possible to replace the pads as may be desirable, for example in case of wear or to suit conditions or different wearers.

Figure 3:
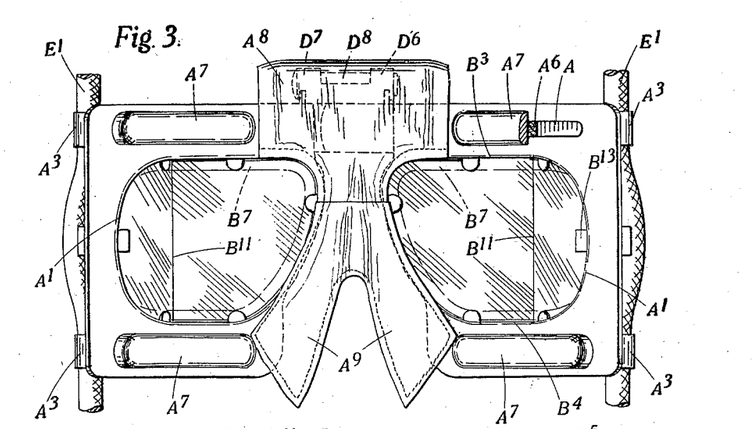
Figure 3 is a rear view of the goggles alone.

The part of each window recess $A^1$ lying adjacent to the nose of the wearer is, as clearly shown in Figures 1 and 3, curved and inclined downwards so that the adjacent upper straight and horizontal portion $B^3$ of the window is longer than the corresponding lower straight horizontal portion $B^4$ and extends to the bridge of the nose, the dimensions of the rim formed on the outer surface of the frame by the corresponding recess $A^1$ being such as to interfere as little as possible with the range of vision. The base of each recess $A^1$ lies in two planes, as clearly shown in Figure 4, at an appropriate angle to one another, namely a main or frontal plane $B^5$ immediately in front of the wearer's eye and a subsidiary or side plane $B^6$ backwardly inclined with respect to the frontal plane $B^5$.

Figure 2:
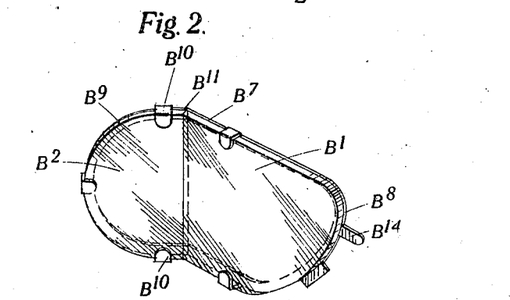
Figure 2 illustrates, on an enlarged scale and in perspective, one of the eye-piece framelets included in Figure 1.

As shown in Figure 2 each pair of main and subsidiary glasses $B^1$, $B^2$ is carried by a framelet $B^7$ formed of metal and whose external contour corresponds to the shape of the recess $A^2$. To this end each framelet $B^7$ comprises a main or frontal portion having straight upper and lower horizontal parts connected by a downwardly inclined end portion $B^8$ and a side or subsidiary portion having short straight upper and lower horizontal parts, joining the upper and lower horizontal parts of the main portion, connected by a curved outer end part $B^9$ (Fig. 2). These main and subsidiary portions which are formed integral with one another thus together form a framelet which will fit snugly in the recess $A^1$ in the corresponding eye-piece frame A. The main and subsidiary glasses $B^1$, $B^2$ are shaped to correspond to the main and subsidiary portions of the framelet $B^7$ which is provided with lugs $B^{10}$ which retain the glasses in the framelet but which can be readily bent out to withdraw the glasses for replacement.

Figure 4:
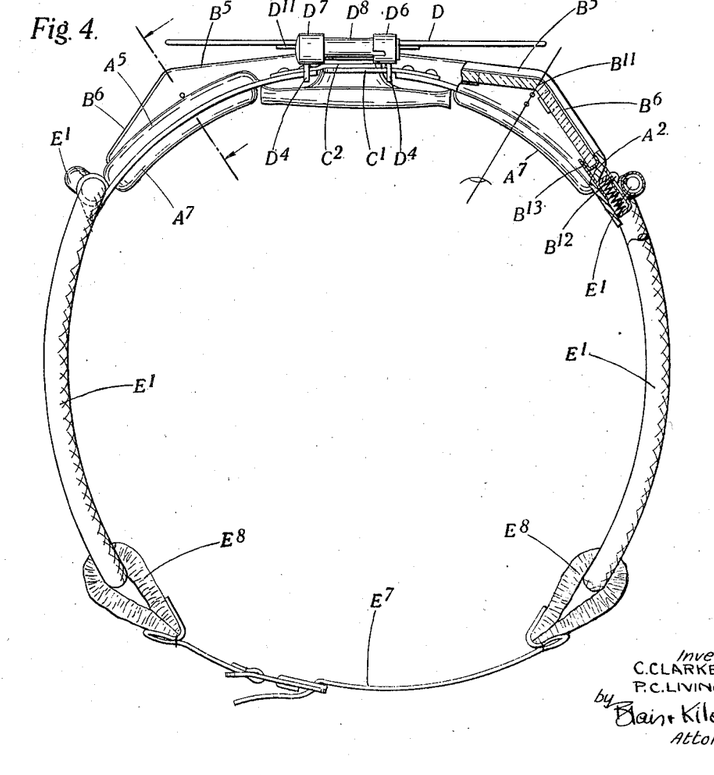
Figure 4 shows the goggles in plan, with part cut away.

The two adjacent edges of the frontal and side glasses $B^1$, $B^2$ abut against each other and are complementarily mitred as shown at $B^{11}$, the plane of contact passing through the eye as indicated in Figure 4 so that in use the joint $B^{11}$ is almost if not wholly invisible to the wearer. Thus, the two glasses are inserted through the two ends of the framelet so as to bring the abutting edges of the glasses firmly into contact and the framelet is then inserted into the corresponding recess $A^1$ in the back of the eye-piece frame A. Each framelet is held in position in its recess $A^1$ by means of a spring latch $B^{12}$ operable from outside the eye-piece frame so as to move a tongue $B^{13}$ which, when the framelet is in position, engages behind the curved edge $B^9$ as shown in Figure 4. At the same time a lug $B^{14}$ formed on the framelet engages a recess formed in the adjacent part of the eye-piece frame A.

It will be apparent that with the arrangement above described the wearer will not only have an extensive and unobstructed range of vision both on the nasal and on the temporal side but will be able readily to remove either the frontal glasses or the side glasses or both in order to substitute other glasses. Normally both front and side glasses, or at least the side glasses, would consist of clear transparent plates, but either or both may consist wholly or in part of optically worked lenses or of tinted or metallised glasses according to requirements.

Figure 5:
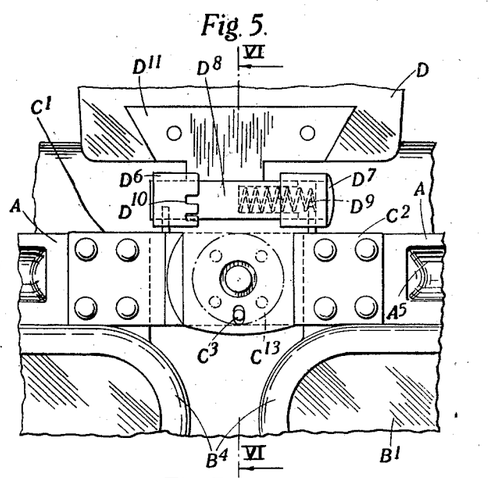
Figure 5 illustrates, on an enlarged scale, the adjustable bridge connection and visor support also included in Figures 1, 2 and 4.
Figures 7, 8:
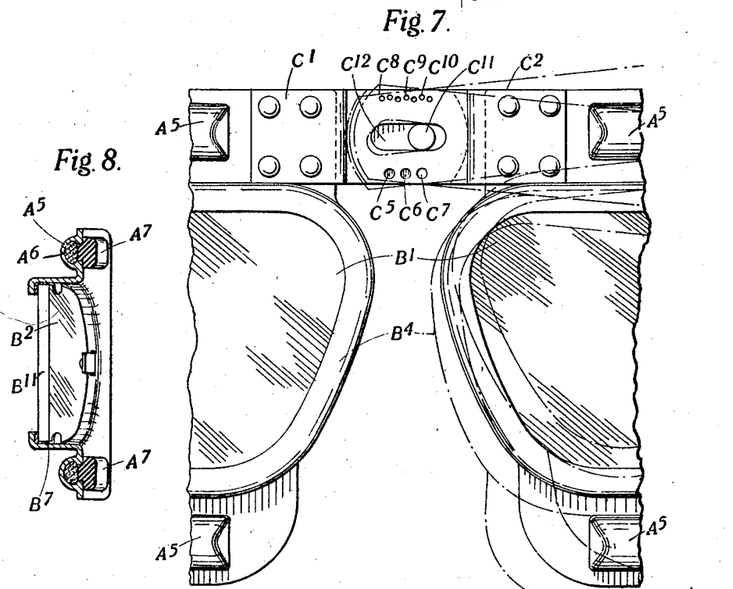
Figure 7 is a view similar to that of Figure 5 but with the visor support and securing nut removed.
Figure 8 is a transverse section through the plane of abutment of the frontal and side glasses.

The adjustable bridge portion C comprises two cooperating elements $C^1$, $C^2$ constituted by two overlapping elongated plate-like members secured to the two eye-piece frames A respectively, the two cooperating plates thus constituting the interconnecting bridge piece of the goggles. The plate-like member $C^1$ carries two fixed pins $C^3$, $C^4$ laterally spaced apart thereon, the pin $C^3$ constituting a pivot pin and having a somewhat larger cross-section than the pin $C^4$ which constitutes a locking pin. The second plate-like member $C^2$ is provided with three apertures $C^5$, $C^6$, $C^7$ spaced apart in the direction of the length of the member $C^2$, that is to say in the direction in which the two elements $C^1$, $C^2$ are to be bodily adjustable relatively to each other. Associated with the pivot apertures $C^5$, $C^6$, $C^7$ are three sets of locking apertures $C^8$, $C^9$, $C^{10}$ formed in the member $C^2$, the three apertures in each set $C^8$, $C^9$, $C^{10}$ being spaced apart approximately along an arc concentric with the associated pivot apertures $C^5$, $C^6$, $C^7$. Each pivot aperture $C^5$, $C^6$ and $C^7$ corresponds in size to that of the pivot pin $C^3$ whilst each locking aperture in the groups $C^8$, $C^9$, $C^{10}$ corresponds in size to that of the locking pin $C^4$, each set of locking apertures $C^8$, $C^9$, $C^{10}$ being spaced from its associated pivot apertures $C^5$, $C^6$ or $C^7$ in the direction of the width of the second plate-like member $C^2$ and by a distance equal to the spacing of the pivot pin $C^3$ and locking pin $C^4$.

The plate-like member $C^1$, which carries the pivot and locking pins $C^3$, $C^4$, is furnished with a screw-threaded stud $C^{11}$ which extends through an elongated slot $C^{12}$ formed in the plate-like member $C^2$ between the pivot apertures and the locking apertures therein. A knurled nut $C^{13}$ engages the thread on the stud $C^{11}$ so that when the nut $C^{13}$ is tightened it bears against the member $C^2$ and thus presses the two members $C^1$, $C^2$ firmly together. The locking pin $C^4$ is somewhat shorter than the pivot pin $C^3$ which extends through the appropriate pivot aperture $C^5$, $C^6$ or $C^7$ into an annular groove $C^{14}$ or recess in the securing nut $C^{13}$, as clearly shown in Figure 6. Thus by an initial release of the nut $C^{13}$ the locking pin $C^4$ can be withdrawn from the locking aperture in which it is then in engagement and transferred to another locking aperture without risk of unintentional withdrawal of the pivot pin $C^3$ from the pivot aperture in which it is then in engagement.

When, for example, the pivot pin $C^3$ engages the pivot aperture $C^6$ and the locking pin engages the middle locking aperture of the set $C^9$ associated with the pivot aperture $C^6$ the members $C^1$ and $C^2$ are in a central position of the angular adjustment available, the two members being then in approximate longitudinal alignment as shown in full lines in Figures 5 and 7. In order to effect angular adjustment of the two eye-piece frames A from this position the securing nut $C^{13}$ is slacked off and the two members $C^1$, $C^2$ are moved laterally apart until the locking pin $C^4$ is withdrawn from the middle locking aperture of the set $C^9$ whilst the pivot pin $C^3$ remains in engagement with the pivot aperture $C^6$ so that the two frames A can be swung about the pivot pin $C^3$ as centre in one direction or the other to bring the locking pin $C^4$ into engagement with either of the two locking apertures lying immediately adjacent to the central locking aperture of the set $C^9$. The parts can then be locked in the new position of adjustment by tightening the securing nut $C^{13}$.

For bodily adjustment of the two frames A towards and away from each other, however, the securing nut $C^{13}$ is slacked off until the pivot pin $C^3$ as well as the locking pin $C^4$ can be completely withdrawn from the apertures in which they are then in engagement. The two members $C^1$, $C^2$ are then bodily adjusted longitudinally to bring the pivot pin $C^3$ into engagement either with the aperture $C^5$ or with the aperture $C^7$. The securing nut $C^{13}$ is then screwed on sufficiently to prevent disengagement of the pivot pin $C^3$ from that pivot aperture whilst permitting angular adjustment of the members $C^1$, $C^2$ to bring the locking pin $C^4$ into engagement with the appropriate locking aperture in either of the sets $C^8$ or $C^{10}$. The securing nut is finally screwed down firmly thus locking the parts in the required relative positions of longitudinal and angular adjustment.

The adjustable connecting device above described has associated therewith a support for the sun-shield D. The said support comprises a carrier plate $D^1$ furnished with an aperture $D^2$ through which freely extends the securing stud $C^{11}$ carried by the member $C^1$, the plate $D^1$ having an opening $D^3$ to cooperate with the pivot pin $C^3$ and having at its opposite end two lugs $D^4$ spaced apart so as to extend over the upper edges of the members $C^1$, $C^2$. The carrier plate $D^1$ is thus normally gripped firmly in position between the securing nut $C^{13}$ and the member $C^2$. Since the carrier plate $D^1$ can tilt about the pivot pin $D^3$ within the limits afforded by the clearance between the securing stud $C^{11}$ and the aperture $D^2$ in the plate $D^1$, whilst the two lugs $D^4$ will remain resting on the upper edges of the members $C^1$, $C^2$, the carrier plate $D^1$ for the visor D will remain substantially vertical for all positions of adjustment of the connecting device C. The visor D is connected to the upper end of the carrier plate $D^1$ through an adjustable hinge or clutch coupling $D^5$.

The coupling $D^5$ comprises two horizontal cylindrical end caps $D^6$, $D^7$ mounted at the upper end of the carrier plate $D^1$ and into which extend respectively opposite ends of a plunger $D^8$ carrying the visor D. A spring $D^9$ extending into a recess within the plunger $D^8$ bears against the inner end surface of the cap $D^7$, the cap $D^6$ having a number of circumferentially placed slots $D^{10}$. The spring $D^9$ thus urges the plunger $D^8$ towards the cap $D^6$ so that one edge of a metal plate $D^{11}$ carrying the visor D will tend to engage one of the slots $D^{10}$, according to the angle of tilt of the visor which consists of an appropriately shaped sheet of tinted glass or other suitable material such for example as a synthetic resin. Thus, by moving the visor D to the right as shown in Figure 5 against the action of the spring $D^9$ the edge of the plate $D^{11}$ is withdrawn from the slot $D^{10}$ in which it is then in engagement and the angle of tilt of the visor D can be adjusted as desired, various positions of tilt of the visor being indicated in Figure 6. The spring then urges the plate $D^{11}$ into the appropriate slot $D^{10}$ so that the visor will be firmly retained in the position of adjustment.

It will be clear that with this arrangement the visor D can be readily adjusted to any chosen position to suit requirements and will be firmly held in such position even against strong wind pressures which may be experienced for example in aeroplanes and open cockpits.

Figure 6:
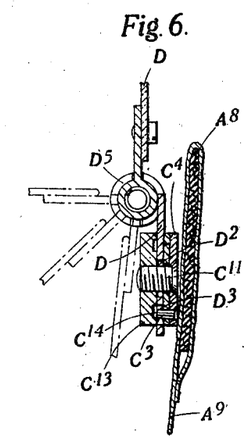
Figure 6 is a section on the line VI—VI of Figure 5.

The connecting device described with reference to Figures 5, 6 and 7 may be modified to suit requirements. For example, any desired number of pivot apertures may be provided according to the required degree of bodily relative adjustment of the two elements and the spacing of the steps of such adjustment. Similarly, any number of locking apertures may be associated with each pivot aperture according to the degree of angular adjustment which it is desired to provide. The number of locking apertures and/or their spacing apart may be the same for each set associated with a locking aperture or such number and/or spacing may differ for different sets, for example in accordance with the distance of the operative pivot pin from the parts, e. g. eye-pieces, which are interconnected by the device. Though in the construction described above the pins on one element cooperate with apertures in the other, the pivot pin and/or the locking pin carried by one element may engage recesses formed in the cooperating surface of the other element, or slots formed in opposite edges thereof.

Figures 9, 10:
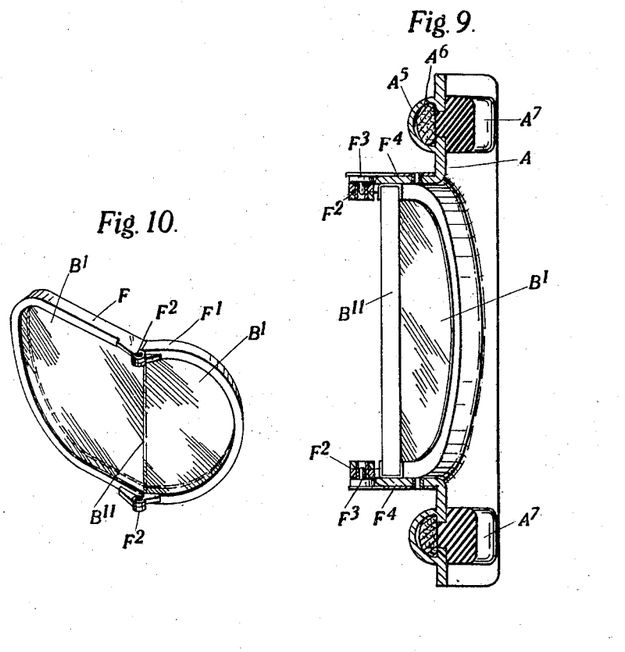
Figure 9 shows, in a manner similar to that of Figure 8, a modified mounting for each eye-piece framelet.
Figure 10 illustrates, on a smaller scale, one of the eye-piece units as employed in Figure 9.

A modified arrangement of each eye-piece is shown in Figures 9 and 10, in which the frontal and side glasses of each eye-piece are mounted in a framelet comprising a main or frontal portion F and a side portion $F^1$ which is connected to the frontal portion by hinges $F^2$. The hinges $F^2$ constitute sockets for pintles $F^3$ connected to the forwardly projecting portion of the eye-piece frame A by springs $F^4$ so that when the eye-piece framelet containing the glasses lies in the corresponding recess in the back of the frame the pintles $F^3$ engage the sockets in the hinges $F^2$ and thus retain the framelet in position in the recess. By flexing the springs $F^4$ outwards however, the pintles are released from the sockets and the framelet can be withdrawn together with the glasses as a unit from the recess in the eye-piece frame. When the framelet has thus been withdrawn the side frame $F^1$ can be swung about the hinges $F^2$ and the main and subsidiary glasses can be withdrawn from the framelet.

Another construction of goggles according to the invention and particularly for use with a helmet as above described with reference to Figure 1, is shown in Figures 11 to 14, in which each eye-piece frame G consists of a stamping of metal or moulding of other suitable material curved to suit the general contours of the face and has an aperture whose edge $G^1$ is turned up to form a flange extending forwardly from the frame G away from the face. The front edge of this flange lies in two planes at an appropriate angle to each other and in one of such planes, namely that directly in front of the eye, has integral with it a trough-like window rim $G^2$ to receive the frontal glass $B^1$. In the other plane the front edge of the flange $G^1$ constitutes a seating against which a trough-like window rim $G^3$ for the side glass $B^2$ normally rests. The side glass rim $G^3$ is curved into more or less semicircular form and at its ends is connected by hinges $G^4$ to the adjacent ends of the main glass rim $G^2$. As clearly shown in Figure 11 the main glass rim $G^2$ has straight portions above and below the eye joined together by a suitable curve $G^5$ at the nasal end, this curve being so chosen as to lie fairly closely to the wearer's nose. Thus the upper straight portion of the rim $G^2$ is longer than the lower straight portion and extends close to the bridge of the nose, the dimensions of these two rims being so chosen as to interfere as little as possible with visibility.

The frontal and side glasses $B^1$, $B^2$ are respectively shaped to fit the two window rims $G^2$, $G^3$, the outer edge of the frontal glass $B^1$ and the forward edge of the side glass $B^2$ being straight but complementarily mitred in the plane $B^{11}$ which extends through the corresponding eye of the wearer, as in the construction above described. Thus, to insert the two glasses $B^1$, $B^2$ into the corresponding window of the goggles, the side glass rim $G^3$ is swung forward in front of the frontal glass rim $G^2$ (as shown dotted in Figure 12) and the two glasses are inserted from the open ends of the rims $G^2$, $G^3$. The side glass rim $G^3$ is then swung back into its operative position in which the straight edges of the two glasses abut against one another in the plane $B^{11}$. As in the construction described with reference to Figure 1 the endless cords $E^1$ extend through eyes $A^3$ at the outer ends of the frames G. In addition, however, each cord $E^1$ lies in a clip $G^6$ on the frame G, one arm of this clip serving as a spring latch behind which the corresponding rim $G^3$ snaps when turned into its closed position.

With this arrangement it will be apparent that the wearer will not only have an extensive and unobstructed range of vision both on the nasal side and on the temporal side as in the construction described with reference to Figure 1 but will at the same time be able readily to remove either the frontal glasses $B^1$ or the side glasses $B^2$ or both, if desired without removing the goggles from the face in order to replace them with other glasses suited to a particular purpose. Normally both the frontal and side glasses, or at least the side glasses, would consist of flat clear transparent plates, but either or both may consist partly or wholly of optically worked lenses or of tinted or metallised glasses according to requirements.

Figure 11:
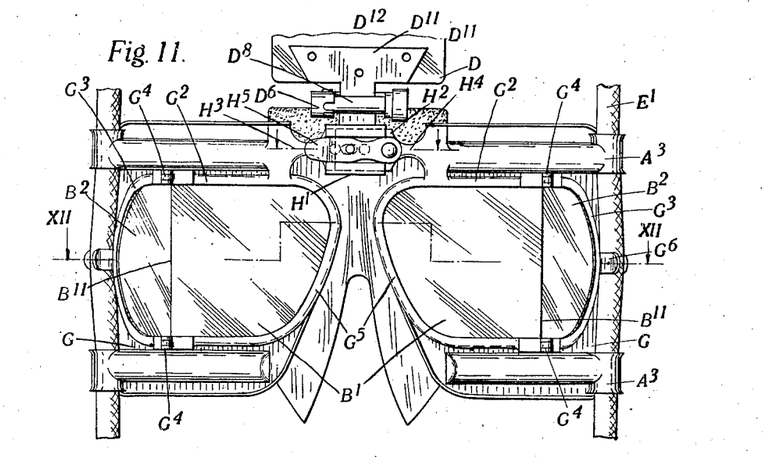
Figure 11 shows a modified construction of goggles in front elevation.
Figure 12:
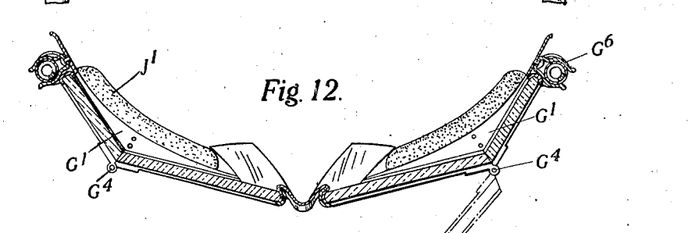
Figure 12 is a sectional plan on the line XII—XII of Figure 11.
Figure 13:
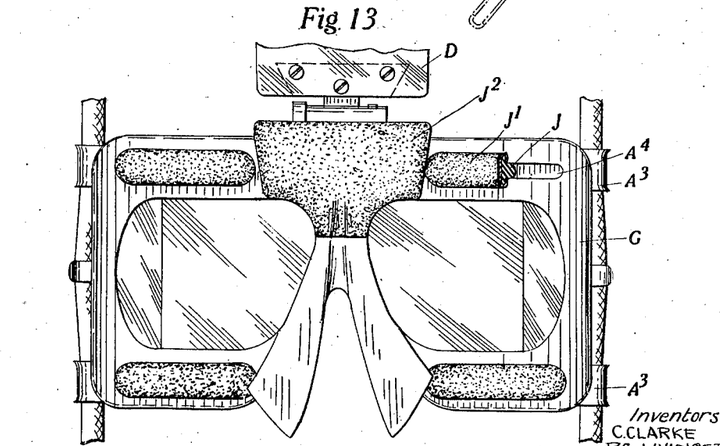
Figure 13 is a back view of the goggles.
Figure 14:
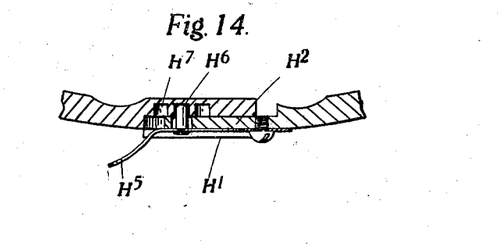
Figure 14 illustrates on an enlarged scale and in sectional plan the interengaging elements of the adjustable bridge member included in Figure 11.

The two eye-piece frames G are connected together by an adjustable bridge portion comprising a box guide $H^1$ in which is longitudinally slidable a block $H^2$, the box guide and block being respectively connected through narrow neck portions $H^3$, $H^4$, to the two eye-piece frames G. A spring tongue $H^5$ carried by the block $H^2$ is furnished with a pin $H^6$ which projects freely through an opening in the block $H^2$ into any one of three apertures $H^7$ formed in the base of the box guide $H^1$. Thus, the distance apart of the two eye-piece frames G can be adjusted by lifting the spring tongue $H^5$ so as to withdraw the pin $H^6$ from one of the apertures $H^7$ whereupon the block $H^2$ can be moved along the box guide $H^1$ until the pin $H^6$ engages another aperture $H^7$. Further, by firm hand pressure on the two eye-piece frames G the neck portions $H^3$, $H^4$ can be bent in any transverse direction to give lateral adjustment of the eye-piece frames, though it will be understood that the complete frame remains more or less rigid in the selected bent position. The complete bridge can therefore be adjusted both longitudinally by sliding and laterally in any direction by bending to enable the goggle frame to be correctly fitted to the face of the wearer. This arrangement is especially advantageous when the eye-pieces (or the frontal glasses thereof) are constituted by sighted lenses, since it enables the lenses to be brought into the correct position to suit the eye separation of the wearer.

As in the construction described with reference to Figures 1 and 3, each eye-piece frame G has slots $A^4$ above and below eye-level and a face pad is detachably mounted in each slot. Each pad consists of a narrow strip of resilient material such as sponge rubber, the front portion of which has a bead J of hard rubber so that the bead can be compressed as it is forced into the slot $A^4$. The back portion of the strip is covered with a soft fabric $J^1$, such as velvet, to form a comfortable pad for resiliently resting against the face of the wearer. Another pad $J^2$ which again consists of velvet-covered sponge rubber is provided behind the adjustable bridge portion between the goggle frames G.

The adjustable mounting for the visor D is similar to that above described but instead of the supporting plate $D^{11}$ cooperating with the slots in the end cap $D^6$, the plunger $D^8$ carries a radially projecting pin $D^{12}$ which cooperates with the slots $D^6$, the ends of these slots being suitably chamfered to facilitate engagement of the pin $D^{12}$.

Figure 15:
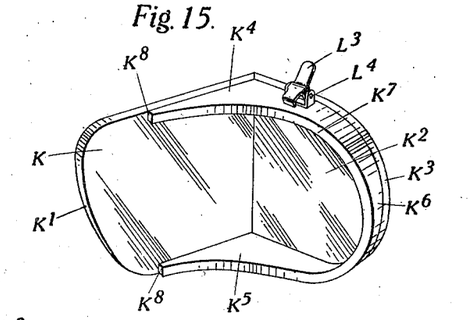
Figure 15 shows in perspective a modified construction of eye-piece unit.

A modified construction of eye-piece is shown in Figure 15 in which the eye-piece is initially made in three parts which are subsequently cemented or otherwise united together to form a single transparent unit. One part K constitutes a front plate and has straight edges at the top and bottom and on the temporal side, whilst on the nasal side the edge $K^1$ is shaped with rounded corners so as to lie fairly close to the wearer's nose. Thus the upper edge is longer than the lower edge and in use extends close to the bridge of the nose. The second part constitutes the side plate $K^2$ and has its front edge straight, for engagement with the temporal edge of the front plate K and its top and bottom edges partly straight and partly curved to form a continuous more or less semi-circular curve $K^3$. The third part consists of a flat top plate $K^4$ and a flat bottom plate $K^5$ with a curved narrow connecting strip $K^6$. The front edges of the top and bottom plates are straight to connect with the top and bottom margins of the front plate K. The side edges of the top and bottom plates $K^4$, $K^5$ and of the connecting strip $K^6$ fit against the margins of the side plate $K^2$ and lie at a suitable angle (say in the neighbourhood of 120°) to the front edges, to ensure that when the three parts are assembled the side plate $K^2$ will lie at an angle to the front plate K most suitable for lateral vision. The rear edge $K^7$ of the third part is curved so that in use it will fit fairly closely to the brows and cheeks of the wearer or to the corresponding external shape or curvature of an eye-piece frame. The inner edges of the top and bottom plates nearest the nose are short and, when the three parts are united together, form small shoulders $K^8$ to facilitate positioning of the unit on an eye-piece frame. The general shape of the third part $K^4$, $K^5$ is preferably such that the top and bottom plates will lie at such angles to the front plate K as will best suit upward and downward vision.

Figure 16:
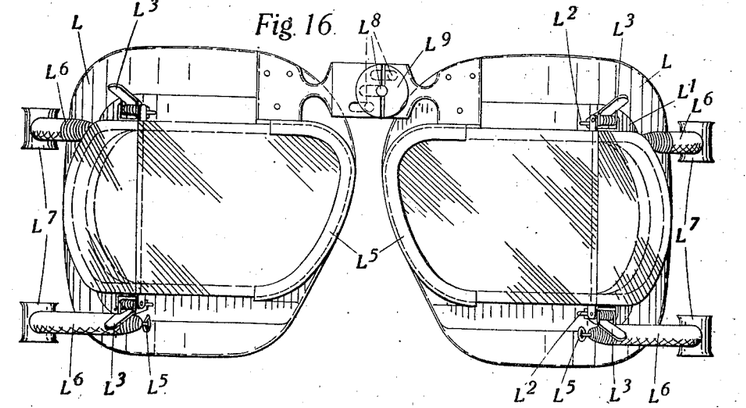
Figure 16 is a front elevation of a pair of goggles including eye-pieces as shown in Figure 15.
Figure 17:
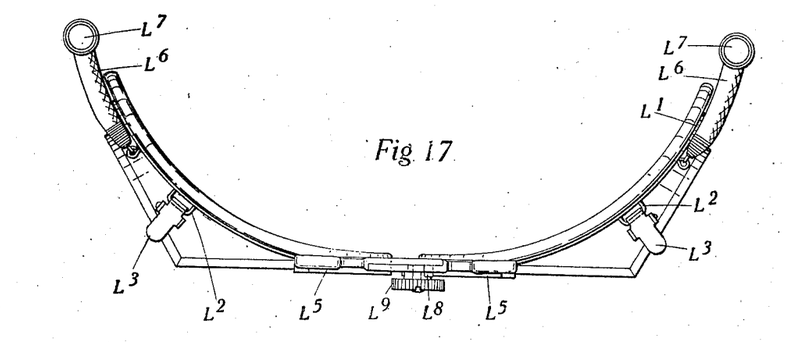
Figure 17 shows the goggles in plan.

Figure 16 shows a pair of goggles furnished with eye-piece frames as described with reference to Figure 15. Each eye-piece frame L consists of a sheet of suitable material curved to suit the general contours of the human face and having an aperture approximately conforming in shape to the curved rear edge $K^7$ of the eye-piece unit, a curved metal rim $L^1$ being provided on the outer surface a small distance away from the edge of the aperture to form a recess for the reception of the edge $K^7$ of the eye-piece unit. The rim $L^1$ carries two small upstanding loops $L^2$ respectively above and below the eye-piece unit, for the reception of spring-controlled clip levers $L^3$ pivoted to lugs $L^4$ attached to the top and bottom plates $K^4$, $K^5$ of the eye-piece unit, the levers $L^3$ being so disposed that they can be gripped simultaneously between the thumb and forefinger of one hand to disengage the levers from the loops $L^2$ and thus enable the eye-piece unit to be removed.

The rim $L^1$ extends only round the top and bottom and rear sides of the aperture, and to facilitate rapid positioning of the eye-piece unit a curved channel member $L^5$ is attached to the frame L so that the open ends of the channel lie between the rim $L^1$ and the aperture. The curve of each channel member $L^5$ conforms to the shape of the nasal edge $K^1$ of the eye-piece unit and the ends of this channel constitute the abutments against which engage the shoulders $K^8$ formed by the inner edges of the top and bottom plates $K^4$, $K^5$. Thus, when attaching the eye-piece unit to the frame L, the nasal edge $K^1$ is inserted into the corresponding channel $L^5$ which thus guides it into the appropriate position determined by the shoulders $K^8$, and in this position the clips $L^3$ will register with the loops $L^2$ for locking the unit in position. The dimensions of the channel $L^5$ and the rim $L^1$ are made such as to interfere as little as possible with the wearer's vision.

The eye-piece unit as described with reference to Figure 15 may be made of glass, or of a transparent synthetic resin, for example of the polymethylmethacrylate series or of the polystyrene series, or similar thermo-plastic material. The eye-piece frame L may also be made of a curved sheet of synthetic resin or other thermoplastic material, the rim $L^1$ and the channel member $L^5$ in such case preferably being of metal.

The frame L is furnished on each side with two small rings $L^5$ secured to the metal rim $L^1$ one above the eye-piece and the other below. Each ring $L^5$ serves as an anchorage for a helical spring $L^6$ carrying an eye $L^7$ at its free end, the lower spring being longer than the upper spring so that the eyes $L^7$ will lie one above the other. The eyes $L^7$ can slide along a spring cord whose ends are attached to a helmet, for example as shown in Figure 1.

The adjustable bridge member shown in Figure 16 is generally similar to that included in Figure 11 but instead of the box guide three pins $L^8$ carried by one bridge member are slidable along slots in the other bridge member, a securing nut $L^9$ being screwed on to the central pin $L^8$.

It will be understood that the plates of the eye-piece may be separate instead of joined together in a single unit but in such case it is preferable for the plates to be in direct engagement with one another at their edges in order to avoid interference with the view. In some instances each eye-piece may be constituted by a front plate for forward vision and a side plate for lateral vision, though it will usually be more convenient to provide one or more additional plates for upward and/or downward vision as above described. Whilst for clear vision it is essential that the plates themselves should be substantially flat, it is sometimes preferable for reasons of mechanical strengthening to include in the unit one or more curved portions in positions where they will not obstruct the vision. Thus, for instance, in the preferred form illustrated in Figure 15 and employing four flat plates increased strength is obtained by employing the curved strip $K^6$. Although the eye-piece unit may be more or less permanently secured in the eye-piece frame L, it is preferred (for example to facilitate cleaning or wiping the plates of the unit without removing the goggles from the head) to mount the unit on the frame in such a manner that it is readily detachable therefrom, for example by means of spring clips as described with reference to Figure 16. In the preferred method of construction a synthetic resin of the polymethylmethacrylate series or of the polystyrene series is used, and the eye-piece unit is initially made in three separate parts, for example by compression moulding, the three parts being subsequently united together to form the complete unit by any of the methods commonly employed for joining parts of such resins.

It will be appreciated that the unit may be built up of four flat plates without the curved connecting strip $K^6$, and in some instances one or other or both of the top and bottom plates $K^4$, $K^5$ may be dispensed with, the eye-piece frame L being appropriately shaped. Moreover, it is not essential to the invention for the unit to be detachable from the frame L, and when a synthetic resin sheet is used for the frame L the eye-piece unit may be permanently united to the frame so that the frame and unit together form an integral structure, the metal rim $L^1$ and channel member $L^5$ being then omitted.

It will be understood that various modifications may be effected in the constructions described. For example, the goggle frame may be formed as a single integral stamping or moulding or as two integral stampings or mouldings, one for each eye-piece, and in the latter case it will usually be preferable to provide a separate face pad or pads for each eye-piece as in the constructions described. The face pads may be secured to the eye-piece frame or frames by means of snap fasteners, that is to say one element of each snap fastener being permanently attached to the face pad whilst the cooperating element may be attached to or extend through the frame. Further, though it is preferred to employ frontal and side glasses mutually inclined as in each of the constructions described, each eye-piece frame may have a front glass only mounted for example in a trough-like rim so as to be withdrawable laterally or may be otherwise secured in position on the frame.

The adjustable bridge member may also be modified. For example, one bridge member may consist of a rod sliding in a hollow socket constituting the second bridge member, a grub screw being provided on the socket so that when screwed down it will firmly clamp the rod in any chosen position therein. In this alternative the rod constituting the first bridge member may itself be sufficiently thin to permit the necessary bending for the transverse adjustment without the provision of a specially reduced neck portion. The socket constituting the second bridge member may have a reduced neck portion between the socket and the eye-piece frame or may be directly connected thereto without the reduced portion. In either event at least one bridge member is made of semi-rigid material for the transverse adjustment.

Each frontal glass and, if desired, also the associated side glass when such is employed, may be constituted by a lens optically worked to correct for visual defects without giving unwanted prismatic effects or "witness marks," that is to say unworked margins surrounding the worked or lens portion. The removability of the glasses in such case permits an individual wearer to insert in a standard eye-piece frame the glasses best suited to his vision. For welding and like purposes at least part of each main or frontal glass may be constituted by or provided with a semi-transparent skin affording protection for the eye against injury from a light source such for example as a welding arc, whilst at least part of the associated side glass is clearly transparent to ordinary light. Thus, it is often necessary for welding to employ a tinted or metallised glass through which it is almost impossible to see anything except the welding arc itself, thus rendering it dangerous for the wearer to move about unless he removes his goggles before doing so. Goggles according to the present invention, whilst adequately protecting the eyes against the effects of the arc, give the wearer at least a limited lateral vision and thus make it possible for him to move about to the same extent with a greatly increased degree of safety. Moreover, the removability of the glasses makes it possible for the operator to replace one glass by another (for example of different tint) during his work, without removing the goggles, to suit different welding processes. A generally similar advantage of ready removability applies also to aircraft uses of the goggles, where it may often be desired to substitute one tinted glass for another to suit different cloud and sky conditions.

The endless cords for connecting the goggles to the helmet may consist of helical springs, preferably covered by suitable fabric, or the connection from each eye or loop on the eye-piece frame may consist of a helical spring. Whatever the construction of the side supports, however, it is preferable that the connections between the endless cords or springs and the helmet be of a readily detachable nature.

What we claim as our invention and desire to secure by Letters Patent is:

1. In protective goggles for personal wear, in combination, two main eyepiece frames having two windows and each formed as an integral stamping, a nasal bridge portion interconnecting said main frames, guides in the main frames adjacent to said bridge portion, two frontal glasses slidably arranged in the said guides respectively, two side glasses mounted to pivot on the main frames respectively, each side glass normally lying in the corresponding main frame and rearwardly inclined with respect to, and abutting against the edge of, the associated frontal glass, the abutting edges being complementarily mitred in a plane extending through the corresponding eye of the wearer, and face pads each comprising a strip of resilient material having a longitudinal bead of rubber which resiliently snaps into an elongated slot in the main frame.

2. In protective goggles for personal wear, in combination, a main eye-piece frame having two windows, a sun shield or visor, and an adjustable device connecting the shield to the main frame, said device comprising two cooperating pivot elements which are relatively rotatable about a horizontal axis and are carried respectively by the main frame and by the shield, at least one dog on one element in clutch-like cooperation with dogs on the other element, and a spring tending to hold said cooperating dogs in engagement, disengagement of the dogs against the action of the spring permitting adjustment of the shield about the horizontal axis to the desired angle of tilt wherein it is firmly held by reengagement of the dogs under the action of the spring.

3. In protective goggles for personal wear, in combination, two eye-piece frames connected by a nasal bridge portion, a frontal glass in each frame, the part of each frame lying adjacent to the nose being downwardly inclined and the transparent area of the corresponding frontal glass extending close up to the nasal bridge beneath the bridge portion, a side glass in each window, each side glass being rearwardly inclined with respect to, and abutting against the adjacent edge of, the associated main glass, a sun shield or visor, and an adjustable device connecting the shield to the nasal bridge portion, said device comprising a horizontal pivot, about which the shield can be adjusted to the desired angle of tilt, and means whereby the shield is firmly held in the position of adjustment.

4. In protective goggles for personal wear, in combination, two eye-piece frames and an adjustable device interconnecting the said frames so as to permit relative bodily adjustment of the frames towards and away from each other and also relative transverse adjustment of the frames, said interconnecting device comprising two cooperating superimposed elements carried by the two frames respectively, a pivot pin carried by the first element, and a locking pin carried by the first element, the pivot pin engaging any one of a plurality of pivot apertures or recesses spaced apart in the second element in the direction of relative bodily adjustment of the two elements, whilst the locking pin engages any one of a plurality of locking apertures or recesses formed in the second element and spaced apart along arcs concentric with the pivot apertures respectively.

5. In protective goggles for personal wear, in combination, two eye-piece frames, a device interconnecting the said frames so as to permit relative bodily adjustment of the frames towards and away from each other and also relative transverse adjustment of the frames, said interconnecting device comprising two cooperating superimposed elements carried by the two frames respectively, a pivot pin carried by the first element and a locking pin carried by the first element, the pivot pin engaging any one of a plurality of pivot apertures or recesses spaced apart in the second element in the direction of relative bodily adjustment of the two elements, whilst the locking pin engages any one of a plurality of locking apertures or recesses formed in the second element and spaced apart along arcs concentric with the pivot apertures respectively, a securing stud carried by one element and extending through an elongated slot in the other element against which bears a securing nut cooperating with the stud, a frontal glass in each frame, the part of each frame lying adjacent to the nose being downwardly inclined and the corresponding frontal glass extending to a position close to the nasal bridge beneath the adjustable connecting device, and a side glass in each frame rearwardly inclined with respect to, and abutting against the adjacent edge of, the associated frontal glass, the abutting edges being complementarily mitred in a plane passing through the corresponding eye of the wearer when the frames have been longitudinally and transversely adjusted to suit the wearer.

6. In protective goggles for personal wear, the combination with the features claimed in claim 4, of a support for a sun shield or visor, said support comprising a carrier which engages the adjustable connecting device at three points triangularly spaced apart, namely at the pivot pin, and at two points spaced apart in the direction of the length of the connecting device.

7. In protective goggles for personal wear, the combination with the features claimed in claim 4, of a sun shield or visor, and a support therefor comprising a carrier plate having an opening which engages the pivot pin of the adjustable connecting device and two lugs which bear against the connecting device at two points spaced apart on the superimposed elements in the direction of their bodily relative adjustment, the securing stud extending freely through the carrier plate.

8. In protective goggles for personal wear, in combination, two eye-piece frames each formed of an integral moulding, interconnecting bridge members carried by the frames respectively, the bridge members, each of which has a reduced neck portion, being relatively adjustable to vary the distance between the frames whilst they can be bent at the neck portions to effect transverse adjustment of the frames, a latch for retaining the bridge members in their positions of relative adjustment, a frontal glass in each frame the part of which lying adjacent to the nose being downwardly inclined so that the frontal glass extends close up to the nasal bridge beneath the interconnecting bridge portion, a side glass in each frame inclined with respect to, and abutting against the adjacent edge of, the associated frontal glass, the abutting edges being complementarily mitred in a plane extending through the corresponding eye of the wearer when the frames have been adjusted to suit the wearer, at least one face pad mounted on that side of each frame adjacent to the wearer's face, each pad comprising a strip of resilient material and having a bead which resiliently snaps into an elongated recess in the frame, and a sun shield or visor connected by an adjustable device to one of the cooperating bridge members, said device comprising two cooperating clutch members carried by the shield and by the said bridge member respectively, the clutch members being normally urged into engagement by a spring.

9. In protective goggles for personal wear, in combination, an eye-piece frame having two windows, two framelets fitting into recesses around the two windows respectively, a frontal glass in each framelet, a side glass in each framelet, each side glass being rearwardly inclined with respect to, and abutting against, the adjacent edge of the associated frontal glass, with the abutting edges complementarily mitred, and at least one releasable latch which holds the framelets in position in the recesses but which can be released to permit removal of the framelets.

10. In protective goggles for personal wear, in combination, an eye-piece frame, each window of the frame having a surrounding recess on that side adjacent to the face of the wearer, an eye-piece framelet in each recess and comprising a main guide containing a frontal glass and a subsidiary guide containing a side glass, the side glass being rearwardly inclined with respect to, and abutting against the adjacent edge of, the associated frontal glass, a pivotal connection between the main and subsidiary guides, and releasable latches carried by the frame and engaging the framelets to maintain them in position in the recesses.

11. In protective goggles for personal wear, in combination, two eye-piece frames, an adjustable bridge portion interconnecting the frames, said adjustable interconnection permitting relative adjustment of the frames towards and away from each other and also transversely with respect to a horizontal axis, two eye-piece framelets fitting into recesses in the eye-piece frames on that side adjacent to the face of the wearer, each framelet comprising a main or frontal portion having guides for receiving a frontal glass constituted by a lens optically worked to correct for visual defects of the wearer, a subsidiary or side portion having guides for receiving a side glass rearwardly inclined with respect to, and abutting against the adjacent edge of, the associated main glass, the abutting edges of the two glasses being complementarily mitred in a plane which extends through the corresponding eye of the wearer, and releasable latches which hold the framelets in position in the recesses.

12. In protective goggles for personal wear, in combination, two eye-piece frames formed of a transparent synthetic resin, an adjustable nasal bridge portion connecting the frames together, a guide adjacent to each window of the frame, an eye-piece in each window comprising a plurality of plates of transparent synthetic resin rigidly connected together, namely a flat frontal plate for forward vision, the nasal end portion of which fits into the corresponding guide on the frame, a side plate for lateral vision and rearwardly inclined with respect to the frontal plate, an upper plate for upward vision and a lower plate for downward vision, the rearward edges of the top and bottom plates being shaped to abut against the associated eye-piece frame, and at least one latch which retains the eye-piece in position on the frame but which can be released to permit withdrawal of the eye-piece as a single transparent unit from the guide.

13. In protective goggles for use with a helmet for personal wear, in combination, an eye-piece frame, and guides at opposite ends of the frame transverse to the length thereof, the said guides being slidable along guides on the helmet extending down the side of the face from an attachment to the helmet above eye level.

14. In protective goggles for use with a helmet for personal wear, in combination, an eye-piece frame, two supports extending laterally across the two ends of the frame respectively, and means whereby each support can be connected to the helmet above eye-level, each support thus extending down one side of the face from the point above eye-level to a point below eye-level so as to hold the goggles firmly in position.

15. The combination with a helmet for personal wear, of protective goggles comprising an eye-piece frame, two supports carried respectively on the two sides of the helmet and each connected to the helmet above eye-level, and means at each end of the frame which engages the corresponding support, each support thus extending down the side of the face from the point of attachment above eye-level to a point below eye-level thus holding the goggles firmly against the face of the wearer.

16. The combination with a helmet for personal wear, of protective goggles comprising an eye-piece frame, two supports extending across the two ends of the frame respectively, each support being attached to the helmet above eye-level and extending down the side of the face to a point below eye-level, and a securing strap which draws the supports back so as firmly to press the goggles against the face of the wearer.

17. The combination with a helmet for personal wear, of protective goggles comprising an eye-piece frame, two flexible loops extending across the ends of the frame respectively, two guide devices secured above eye-level to the two sides of the helmet, and two guide devices secured below eye-level to the two sides of the helmet respectively, each flexible loop thus extending across the corresponding end of the eye-piece frame and through the two guiding devices above and below eye-level on the corresponding side of the helmet.

18. The combination with the features claimed in claim 17, of two plates respectively secured to the two sides of the helmet, and a plurality of retaining devices carried by each plate and arranged at different levels thereon, at least one of the guiding devices on each side of the helmet comprising an eye which will engage any one of the said retaining devices.

19. The combination as claimed in claim 17, in which each flexible loop is slidable through the guide devices carried by the helmet.

20. The combination as claimed in claim 17, in which each flexible loop is slidable through at least one eye by which the loop is attached to the corresponding end of the eye-piece frame.

21. In combination with a helmet, a pair of goggles comprising two eye-piece frames each made of an integral moulding of a phenolic condensation product, an adjustable bridge portion connecting the frames together, said bridge member permitting relative bodily adjustment of the frames and also relative transverse adjustment thereof, at least one eye carried at the outer or free end of each frame, two endless cords extending through the said eyes respectively, anchoring devices arranged on each side of the helmet above and below eye-level respectively, the corresponding endless cord engaging said anchoring devices, face pads detachably carried on the inner faces of the frames, each face pad having a part which is in resilient snap engagement with a complementary part on the corresponding goggle frame, two eye-piece framelets fitting respectively into recesses formed around the two windows of the goggles, a frontal glass in each framelet, a side glass in each framelet rearwardly inclined with respect to, and abutting against the adjacent edge of, the associated frontal glass, the abutting edges being complementarily mitred in a plane extending through the corresponding eye of the wearer, and releasable latches carried by the frames and retaining the framelets in position in the recesses, the nasal portion of each frame being downwardly directed so that the transparent area of each frontal glass extends close up to the bridge of the nose immediately beneath the adjustable bridge portion.

22. In protective goggles for personal wear, in combination, two eye-piece frames each having a window therein and made of an integral moulding of transparent synthetic resin, an adjustable bridge portion connecting the eye-piece frames together so as to permit relative bodily adjustment of the frames in a longitudinal direction, and also relative transverse adjustment of the frames, two eye-piece units respectively registering with the two windows, each eye-piece unit comprising a frontal plate for direct vision, a side plate for lateral vision, a top plate for upward vision and a bottom plate for downward vision, said plates being all formed of transparent synthetic resin and rigidly connected together so as to constitute a single transparent unit, and releasable latches connecting said eye-piece units to the eye-piece frames, the nasal portion of each eye-piece frame being downwardly and outwardly inclined so that the transparent area of each frontal glass extends up close to the nasal bridge immediately beneath the adjustable bridge portion.

23. In combination with a helmet, a pair of goggles comprising two eye-piece frames each having a window and made of a single integral metal stamping, an adjustable bridge portion connecting the frames together, said bridge portion comprising two parts in sliding engagement with each other, a latch for retaining said parts in their relative position of adjustment, reduced neck portions connecting said two parts to the two frames respectively so that the frames can be transversely adjusted by bending at the said neck portions, a guide channel around that part of each window adjacent to the nose of the wearer, a frontal glass slidably arranged in each channel, which is inclined downwards and outwards adjacent to the nose so that the transparent area of the frontal glass extends up close to the nasal bridge immediately beneath the bridge portion, a subsidiary frame in each window, a hinge between each subsidiary frame and the corresponding main eye-piece frame, a side glass in each subsidiary frame, said side glass being rearwardly inclined with respect to, and abutting against the adjacent edge of, the associated frontal glass, releasable latches retaining the subsidiary frames in the normal position but which can be released to enable each subsidiary frame to be swung outwards thus permitting withdrawal of the frontal and side glasses, at least one eye carried at each outer end of each eye-piece frame, two elastic endless cords extending through the eyes in the frames respectively, anchoring devices on each side of the helmet above and below eye level, the endless cords engaging said anchoring devices, at least one detachable face pad carried on that side of each eye-piece frame adjacent to the face of the wearer, a sun shield or visor, and an adjustable coupling connecting said visor to the adjustable bridge portion, the said coupling permitting adjustment of the angle of tilt of the visor and automatically retaining the visor in the adjusted position.

CLEMENT CLARKE.
PHILIP CLERMONT LIVINGSTON.